US012773964B2

(12) United States Patent
White et al.

(10) Patent No.: US 12,773,964 B2
(45) **Date of Patent: *Oct. 27, 2026**

(54) SENSOR MOUNTING ARRANGEMENT FOR A METAL BUMPER

(71) Applicant: Robert Bosch GmbH, Stuttgart (DE)

(72) Inventors: Michael T. White, Livonia, MI (US); Frank S. Loria, Highland, MI (US); Michael L. Marra, Auburn Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 183 days.

This patent is subject to a terminal disclaimer.

(21) Appl. No.: 18/936,615

(22) Filed: Nov. 4, 2024

(65) Prior Publication Data

US 2025/0145100 A1 May 8, 2025

Related U.S. Application Data

(63) Continuation-in-part of application No. 18/501,807, filed on Nov. 3, 2023, now Pat. No. 12,570,230.

(51) Int. Cl.
*B60R 19/48* (2006.01)

(52) U.S. Cl.
CPC .................................. *B60R 19/483* (2013.01)

(58) Field of Classification Search
CPC ..... B60R 19/02; B60R 19/023; B60R 19/483; B60R 2019/1813
USPC .................................................. 293/117, 121
See application file for complete search history.

(56) References Cited

U.S. PATENT DOCUMENTS

| | | | | |
|---|---|---|---|---|
| 6,239,134 | B1 | 5/2001 | Sabb et al. | |
| 7,325,775 | B2 | 2/2008 | Chen | |
| 7,384,082 | B2 | 6/2008 | Blake | |
| 7,537,224 | B2 | 5/2009 | Morris et al. | |
| 7,753,419 | B2 | 7/2010 | Kondo | |
| 8,910,986 | B1 | 12/2014 | Appukutty et al. | |
| 9,381,880 | B2 | 7/2016 | Matecki et al. | |
| 10,254,401 | B2 | 4/2019 | Suyama et al. | |
| 11,353,545 | B2 | 6/2022 | Bae | |
| 12,570,230 | B2 * | 3/2026 | White | B60R 19/483 |

(Continued)

FOREIGN PATENT DOCUMENTS

| | | | |
|---|---|---|---|
| DE | 102015016206 | A1 | 6/2017 |
| EP | 3339105 | A1 | 6/2018 |

OTHER PUBLICATIONS

U.S. Appl. No. 18/501,807, filed Nov. 3, 2023 by White (not submitted herewith pursuant to the waiver of 37 CF. R. § 1.98(a)(2)(iii) issued by the Office on Oct. 19, 2004).

*Primary Examiner* — Jason S Daniels
(74) *Attorney, Agent, or Firm* — Michael Best & Friedrich LLP

(57) ABSTRACT

A method of coupling a sensor to a metal bumper for a vehicle, including providing a substrate configured as a sheet of metal for forming the metal bumper. The metal bumper is formed from the sheet of metal, the metal bumper having an exterior side and an interior side. An aperture is formed within the sheet of metal, including forming a perimeter of the aperture to receive the sensor therein and forming a tab configured to support the sensor. The sensor is inserted into the aperture from the interior side to an assembled position in which a front end of the sensor is flush with the aperture and the sensor is fixed to the metal bumper by the tab.

20 Claims, 12 Drawing Sheets

(56) References Cited

U.S. PATENT DOCUMENTS

| | | | |
|---|---|---|---|
| 2006/0232081 A1 | 10/2006 | Sato et al. | |
| 2023/0070901 A1 | 3/2023 | Ueda et al. | |
| 2023/0311799 A1* | 10/2023 | Mori ........................ | B60R 19/48 293/117 |

* cited by examiner

SENSOR MOUNTING ARRANGEMENT FOR A METAL BUMPER

CROSS-REFERENCE TO RELATED APPLICATIONS

This application claims priority as a continuation-in-part of co-pending U.S. patent application Ser. No. 18/501,807, filed Nov. 3, 2023, the entire contents of which are incorporated by reference herein.

BACKGROUND OF THE DISCLOSURE

The present disclosure relates to metal bumpers for vehicles. More particularly, the present disclosure relates to mounting a sensor to a metal bumper for a vehicle.

SUMMARY OF THE DISCLOSURE

The present disclosure provides, in one aspect, a method of coupling a sensor to a metal bumper for a vehicle. The method includes providing a substrate configured as a sheet of metal for forming the metal bumper. The metal bumper is formed from the sheet of metal, the metal bumper having an exterior side and an interior side. An aperture is formed within the sheet of metal, including forming a perimeter of the aperture to receive the sensor therein and forming a tab configured to support the sensor. The sensor is inserted into the aperture from the interior side to an assembled position in which a front end of the sensor is flush with the aperture and the sensor is fixed to the metal bumper by the tab.

The present disclosure provides, in another aspect, a method of coupling a sensor to a metal bumper for a vehicle, including providing the metal bumper having an exterior side and an interior side. An aperture is formed within the metal bumper. From the material of the bumper, a tab configured to support the sensor is formed. A retainer is locked to the bumper via the tab, the retainer remaining exclusively on the interior side of the bumper. From the interior side, the sensor is inserted to an assembled position in which a front end of the sensor is flush with the aperture. The sensor is locked to the retainer.

The present disclosure provides, in yet another aspect, a metal bumper assembly for a vehicle, formed by one of the preceding methods.

DETAILED DESCRIPTION

Vehicles, such as pickup trucks, may include front and rear bumpers formed of metal. The bumpers are not located behind a plastic cover. In other words, the bumpers are exposed to the front and/or rear of the vehicle. Many of such vehicles include sensors coupled to at least one of the front or the rear bumpers to collect information for driver assistance aids. For example, a pickup truck may include an ultrasonic sensor coupled to a front bumper of the pickup truck. The ultrasonic sensor may collect data representative of a distance between the sensor and an object (e.g., an object in front of the vehicle) to aid a driver in parking the truck. Such sensors, also known as proximity sensors, are typically coupled to the bumper via a retainer. In some implementation, a vehicle may include a plurality of sensors, and it is desirable to decrease the number of components necessary for supporting the sensors to decrease the overall cost of manufacturing the vehicle. The present disclosure thus provides a method for coupling a sensor to a metal bumper for a vehicle without an intervening structure (e.g., a retainer). While a pickup truck is mentioned above as an example vehicle in which a bumper according to the present disclosure may be implemented, it should be understood that the metal bumper and sensor mounting arrangement may be implemented in other vehicle types that include exposed metal bumpers and would benefit from a sensor.

Figure 1:
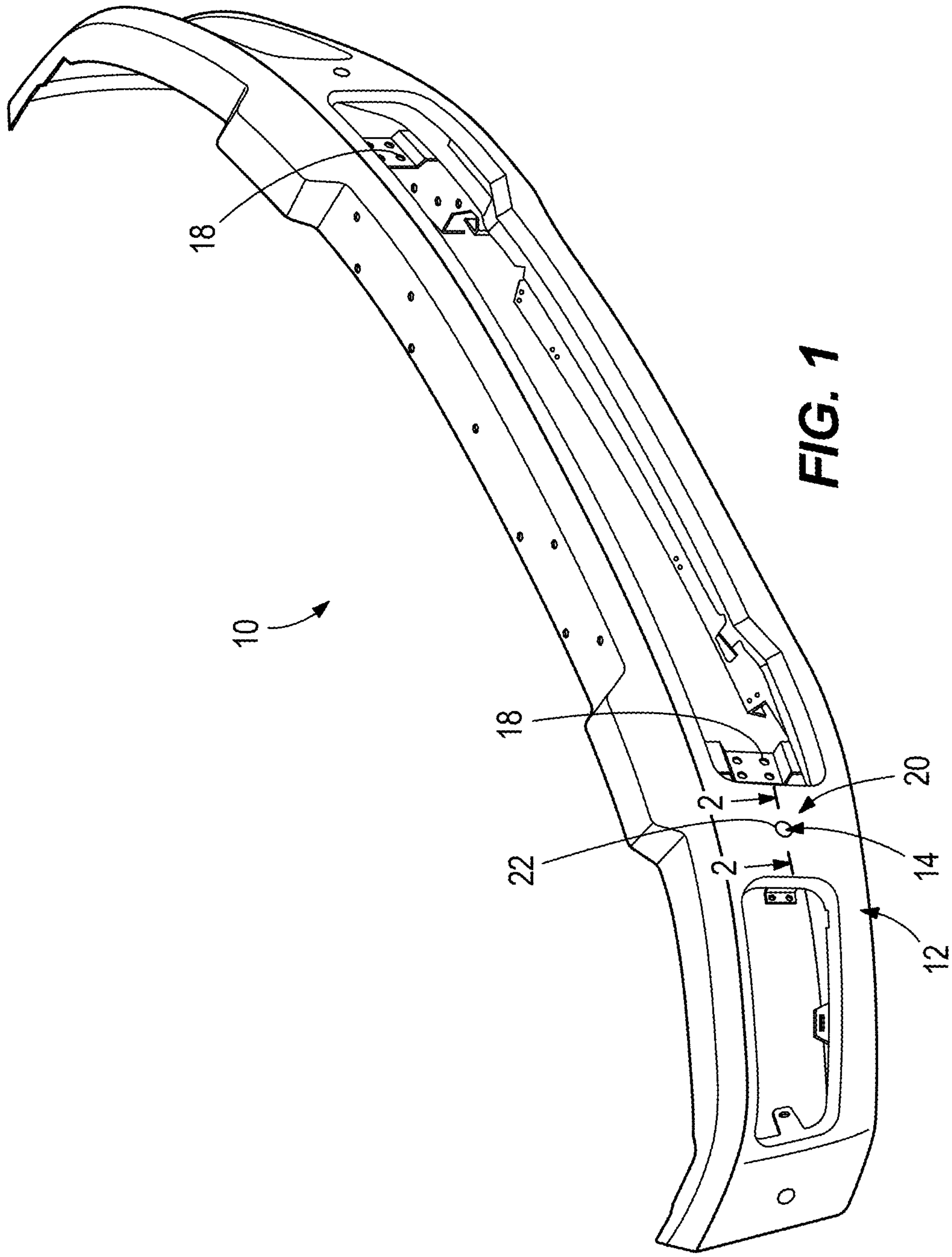
FIG. 1 illustrates a perspective view of a metal bumper for a vehicle including a sensor mounted thereon.

FIG. 1 illustrates a metal structure for a vehicle that is exposed to the front or rear of the vehicle. In the illustrated embodiment, the metal structure is a bumper 10, such as a front bumper for a pickup truck. The bumper 10 is formed of metal, such as steel. It should be understood that in some embodiments the bumper 10 may be formed from metals other than steel, or may be formed only partially of steel (e.g., at a sensor mounting location). The bumper 10 may be formed from a substrate or sheet of material that is subsequently formed (e.g., stamped) into the shape of the bumper 10. The bumper 10 has a shape that is convex with respect to an exterior (e.g., front) surface 12 thereof. In other constructions, the shape of the bumper 10 may be more or less convex than shown in FIG. 1. In some constructions, the overall shape of the bumper 10 is substantially flat. Regardless of the overall shape of the finished bumper 10, a localized portion of the bumper 10 may generally define a primary sheet plane owing to its sheet construction. In other words, the bumper 10 has the exterior surface 12 and an opposite interior surface 13 that are substantially parallel to each other and offset by a thickness of the sheet forming the bumper 10 as shown better in FIG. 2.

A sensor 14 is coupled to the bumper 10 without the use of an intervening retainer. In other words, the sensor 14 is supported directly by the bumper 10. The bumper 10 includes a mounting portion, illustrated as a plurality of mounting flanges 18, to be coupled to a vehicle (not shown). The plurality of mounting flanges 18 secure the bumper 10 to the vehicle in a manner that will be understood by one of ordinary skill in the art. The bumper 10 further includes a sensor mounting arrangement 20 having an aperture 22 for receiving and supporting the sensor 14 relative to the bumper 10.

Figure 2:
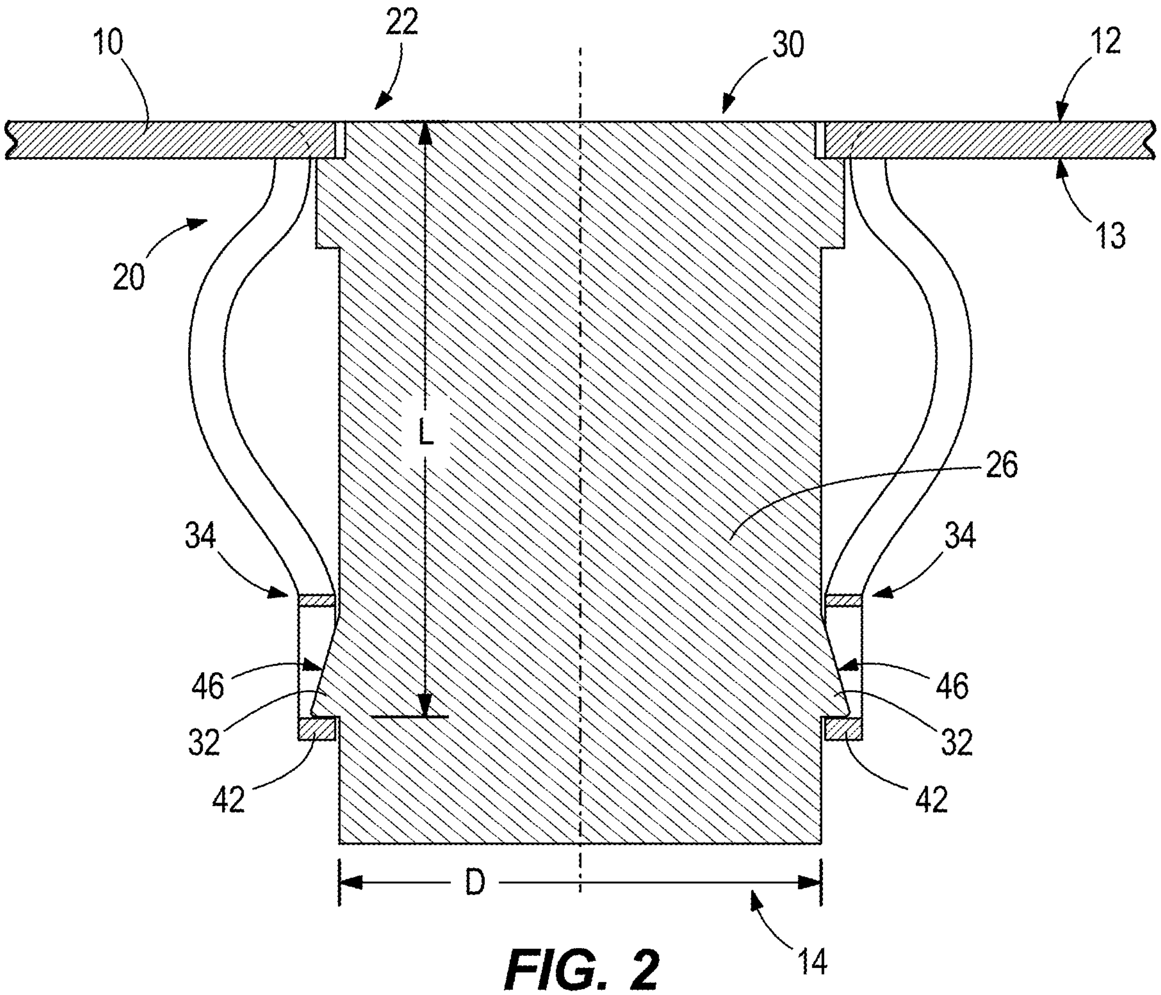
FIG. 2 is a cross-sectional view of a portion of the metal bumper of FIG. 1, taken along section line 2-2 in FIG. 1.

FIG. 2 illustrates a cross-sectional view of the sensor 14 in accordance with an embodiment of the present disclosure. The sensor 14 includes a body 26 to be coupled to the bumper 10 and a sensing component 30 supported by the body 26. The body 26 further includes a locking feature 32 to couple the sensor 14 to the bumper 10. When coupled to the bumper 10, the sensing component 30 is positioned forward of the body 26 and proximate the bumper 10, while at least a portion of the body 26 of the sensor 14 extends into the aperture 22 and rearwardly of the bumper 10. As shown in FIG. 2, the front end of the sensor 14 is positioned flush with the aperture 22. The front end of the sensor 14 may be flush with the exterior (e.g., front in the case of a front bumper) surface 12 of the bumper 10 when secured by the sensor mounting arrangement 20 of the bumper 10. Since there is no separate retainer used between the sensor 14 and the bumper 10, the sensor 14 is situated in (or directly "occupies") the aperture 22 with nothing therebetween. A small clearance for assembly may be provided between the outside of the sensor 14 and the aperture 22 of the bumper 10. In some embodiments, the sensor 14 is an ultrasonic sensor. It should be understood that sensors of other types and shapes may be coupled to the bumper 10 in the manner described herein by adjusting a shape of the aperture 22. Furthermore, while a single sensor 14 is described herein, it should be understood that, in some embodiments, a plurality of sensors 14 may be coupled to the bumper 10. The plurality of sensors 14 may be all of the same type or may be formed of various different sensors 14.

Figure 3:
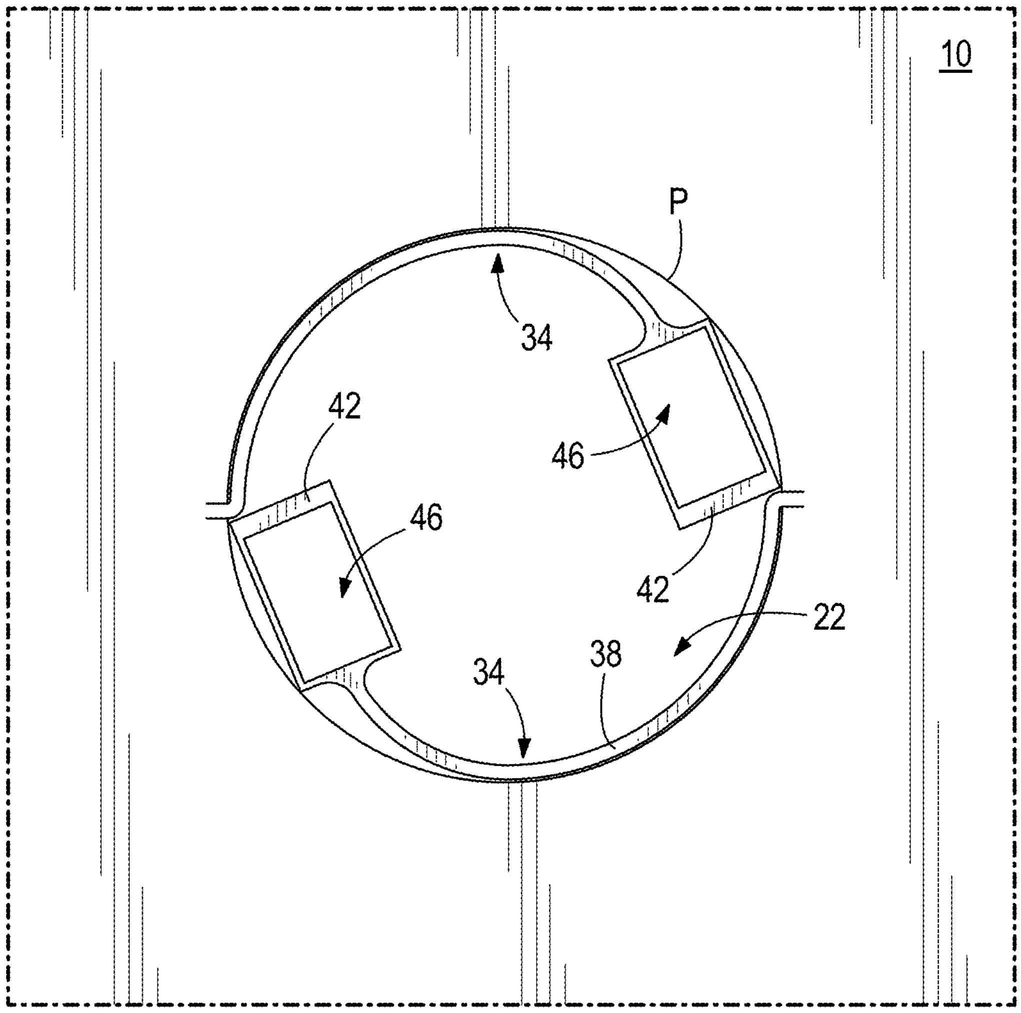
FIG. 3 illustrates a portion of the metal bumper of FIG. 1, prior to mounting the sensor thereon.

With reference to FIG. 1, the aperture 22 is located within the bumper 10 to properly position the sensor 14 without interfering with operation of the bumper 10. The sensor 14 is thus positioned to be able to collect data without interfering with operation of the bumper 10. Referring now to FIG. 3, the aperture 22 is defined by a perimeter P having a cross-sectional area that corresponds to a cross-sectional area of the sensor 14. In the illustrated embodiment, the perimeter P of the aperture 22 is circular in cross-section. The perimeter P of the aperture 22 is not required to form a perfect circular cross-section. For example, the perimeter P may be overall circular and includes portions that deviate from the circle (e.g., flat portions). In other embodiments, the perimeter P may be rectangular, polygonal, or be defined by other regular or irregular geometric shapes. Regardless of the shape of the perimeter P, the cross-sectional shape of the perimeter P corresponds to a shape of the sensor 14. The sensor mounting arrangement 20 further includes at least one tab 34 extending from the perimeter P of the aperture 22. The tab 34 is engageable with the sensor 14 to support the sensor 14 relative to the bumper 10. The tab 34 is integrally formed from the same material as the bumper 10. Thus, the tab 34 is not attached to the bumper 10 via a post-processing method (e.g., welding or securing with additional fasteners) during manufacturing of the bumper 10. Rather, as will be described in greater detail herein, the tab 34 is formed by selectively removing material from the bumper 10 during formation of the aperture 22.

The illustrated embodiment includes two tabs 34 extending from the perimeter P of the aperture 22. However, it should be understood that an aperture 22 may be formed with a single tab 34 or more than two tabs 34 based on the desired number of mounting locations for the sensor 14. In other words, if a sensor 14 includes three connection points to be properly supported, a sensor mounting arrangement 20 may be formed with three tabs 34 extending from a perimeter P of the aperture 22 in which the sensor 14 is to be located.

With continued reference to FIGS. 3-7, each tab 34 includes a spacer 38 extending from the perimeter P of the aperture 22 and a support portion 42 disposed at an end of the spacer 38 opposite the aperture 22. As will be understood by one of ordinary skill in the art, the support portion 42 is shaped to be attached to the sensor 14. In the illustrated embodiment, the support portion 42 includes an aperture 46 in which a portion of the sensor 14 is receivable to support the sensor 14 relative to the bumper 10. The support portion 42 is generally rectangular in shape, and the aperture 46 is also generally rectangular in shape. Thus, the support portion 42 and the aperture 46 are similar in shape. In some embodiments, the aperture 46 is not similar in shape to the support portion 42. The aperture 42 may have any shape corresponding to the portion of the sensor 14 to which it is to be coupled.

With reference to FIG. 2, the sensor 14 is sized such that a length L of the body 26 is longer than a diameter D of the aperture 22. The length L of the body 26 is defined as the distance between the sensing component 30 and the locking feature 32. The tab 34 is formed from material originally located within the perimeter P of the aperture 22. Thus, to form a spacer 38 of a length necessary to support the sensor 14, the spacer 38 is curved similarly to the aperture 22. An arc length of the aperture 22 is sufficient to form a length of the spacer 38. In the illustrated embodiment, each spacer 38 extends approximately half of the perimeter P of the aperture 22.

Figure 4:
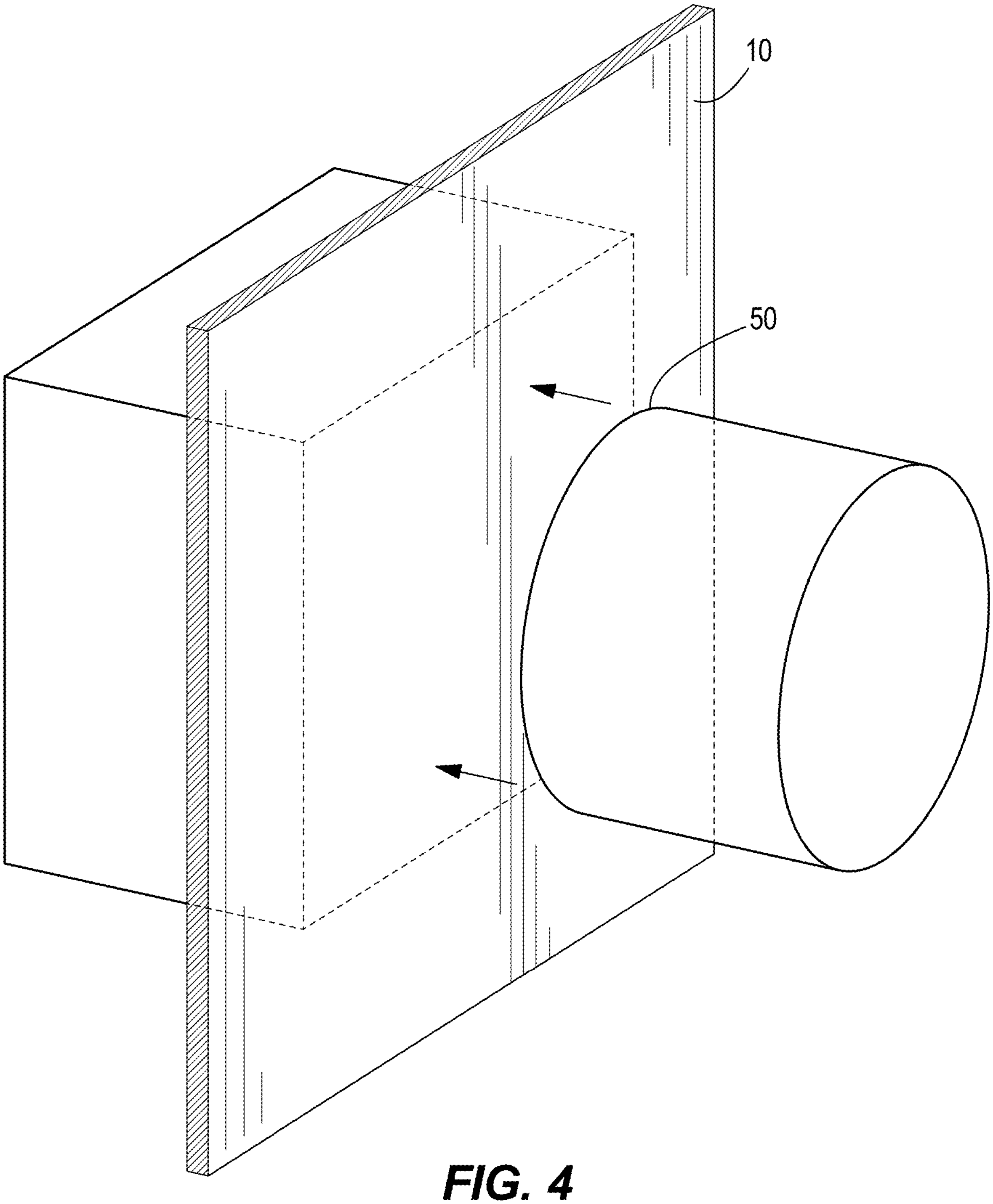
FIG. 4 illustrates a portion of the metal bumper of FIG. 1, prior to formation of a sensor mounting formation.

A method for coupling the sensor 14 to the bumper 10, including manufacture of the bumper 10, is described with reference to FIGS. 4-6. First, the bumper 10 is provided and a desired location for the sensor 14 is determined. In some embodiments, providing the bumper 10 includes providing a substrate for the bumper 10 (e.g., sheet of steel), while in other embodiments the bumper 10 is pre-formed with the desired contour. The sensor mounting arrangement 20 is then formed within the bumper 10. In some embodiments, forming the sensor mounting arrangement 20 may occur simultaneously with forming the bumper 10 from a sheet of metal. In particular, the bumper 10 undergoes a shaping process, such as stamping, to give the bumper 10 its contour, and the stamping process includes localized punching to form (i.e., die cut) the aperture 22 and the tab(s) 34. As noted above, the stamping of the overall shape of the bumper 10 can be separate from, either before or after, the punching of the features of the sensor mounting arrangement 20. In some embodiments, the aperture 22 and the tab 34 may be formed from other manufacturing processes capable of removing material from the metal bumper (e.g., laser cutting, milling, etc.). The tabs 34 are formed from material originally located within the perimeter P of the aperture 22. Thus, the material removal process does not remove the entirety of the material located within the perimeter P. In the illustrated embodiment, a stamping die set 50 is shaped to remove material forming a majority of the perimeter P of the aperture 22, while leaving in place material that forms the tab 34. The stamping die set 50 also includes a punch that removes material from the tab 34 to form the aperture 46 within the support portion 42. The stamping die set 50 simultaneously forms the aperture 22 and the tab 34 within the aperture 22. In other embodiments, the stamping die set 50 can include multiple punches used to remove material from the bumper 10 to create the aperture 22 and the tab 34.

Figure 5:
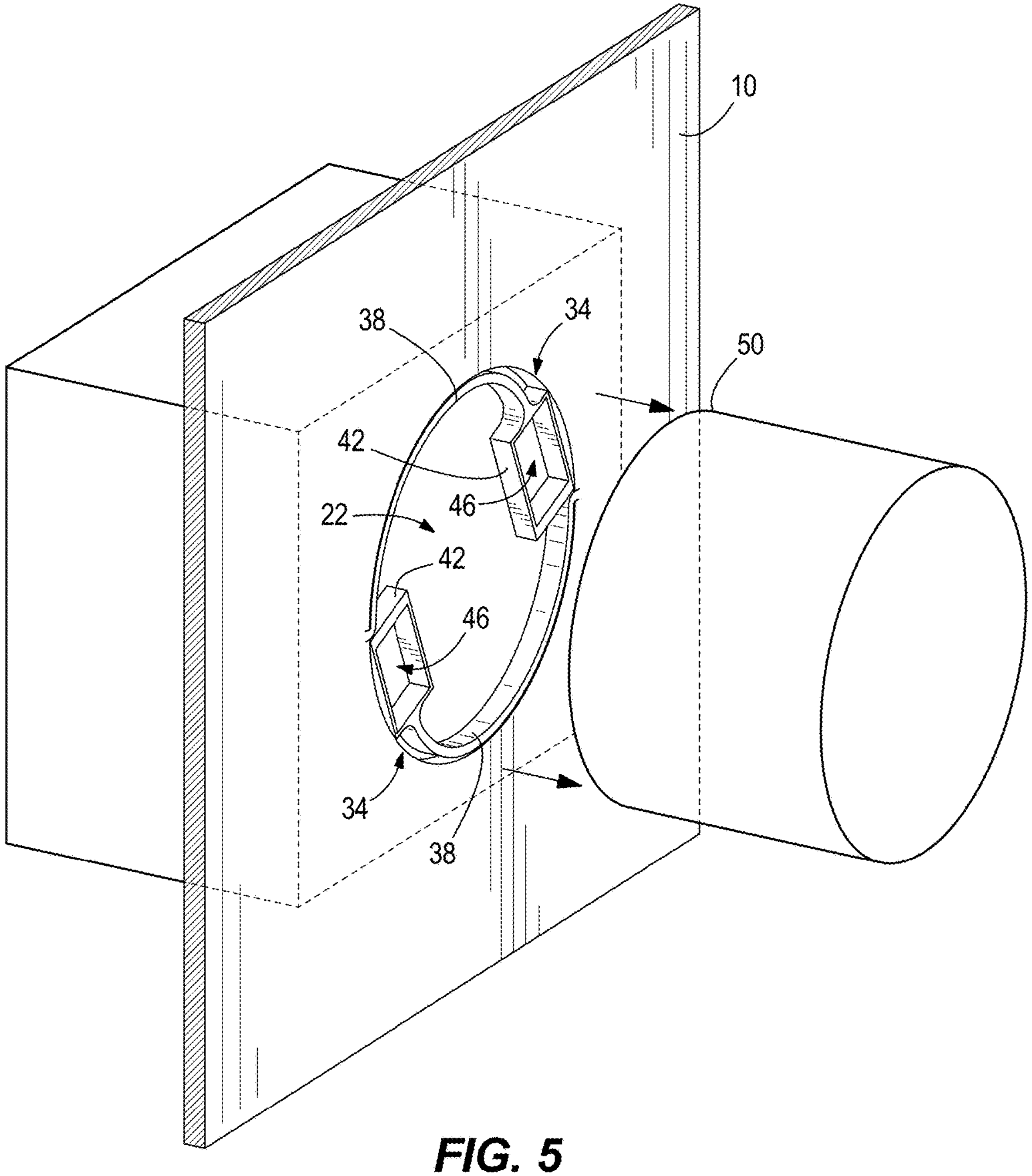
FIG. 5 illustrates the portion of the metal bumper of FIG. 4, after formation of the sensor mounting formation.
Figure 6:
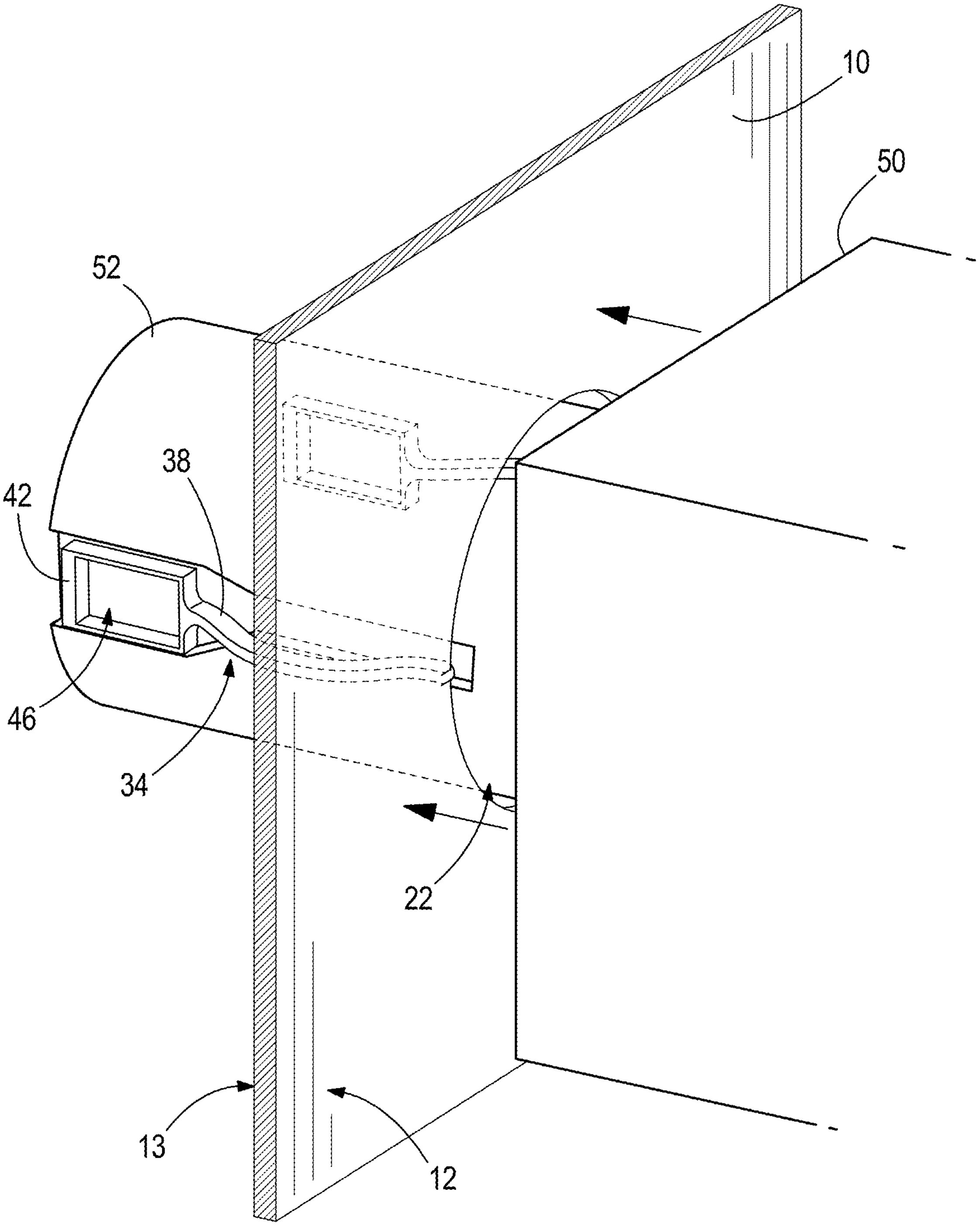
FIG. 6 illustrates a process for deforming a portion of the sensor mounting formation of FIG. 5.
Figure 7:
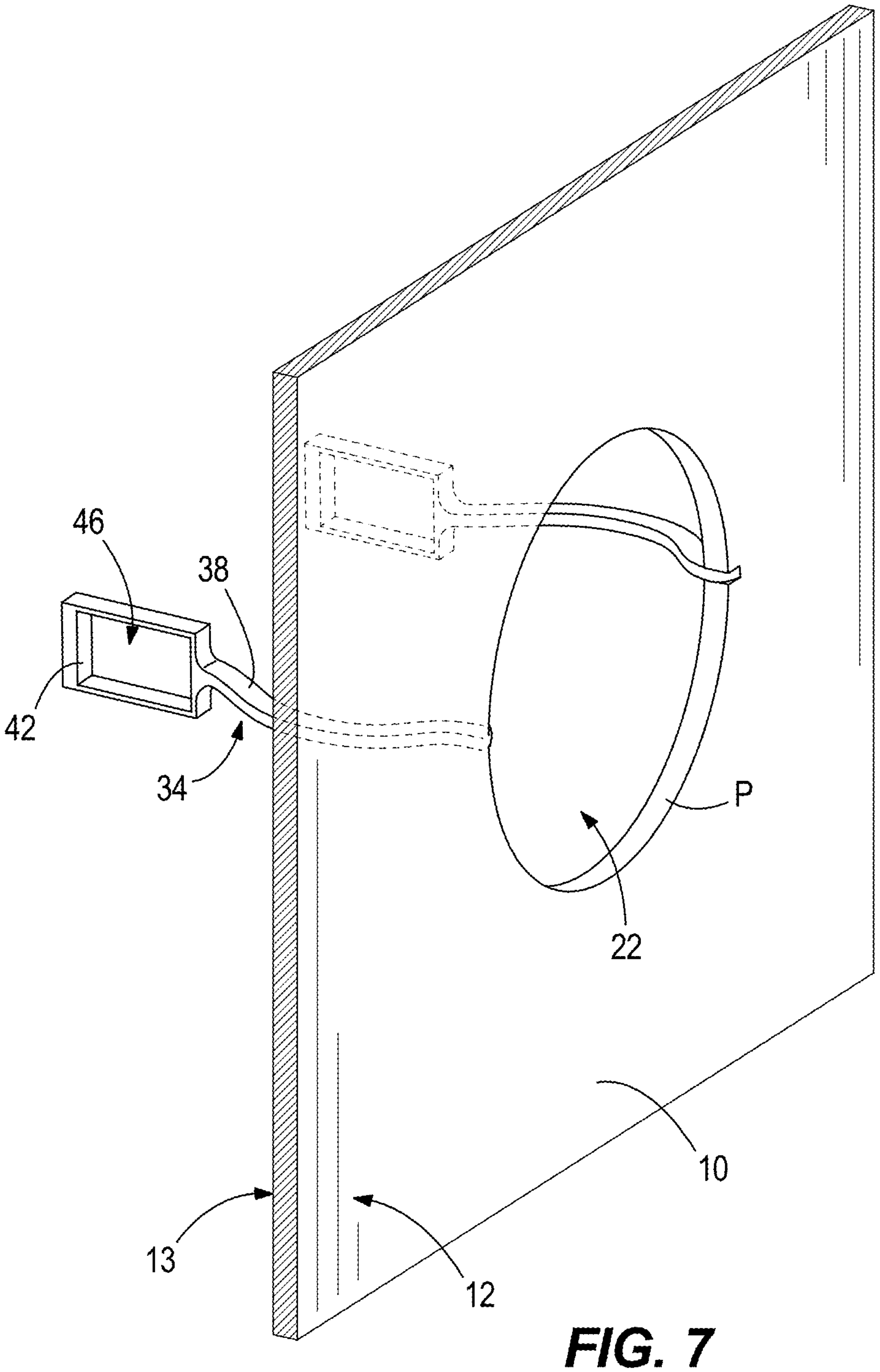
FIG. 7 is a perspective view of the sensor mounting formation.

As shown in FIG. 5, the tab 34 extends into the aperture 22 after the material removal process. The tab 34 is then deformed out of plane of the aperture 22 as shown in FIG. 6 (e.g., from being within a sheet plane defined by the sheet of material to being perpendicular to the sheet plane). In the illustrated embodiment, the stamping die set 50 includes a cylindrical die 52 sized and shaped to be inserted into the aperture 22 to deform the tab 34 out of plane of the aperture 22. In other words, the tab 34 is bent rearwardly and toward an interior of the bumper 10. In other embodiments, the tab 34 may be bent in other orientations, depending on the shape of the sensor 14 and the location on the sensor 14 to which the tab 34 is to be coupled. Following deformation of the tab 34 (and the additional tab 34 as illustrated), the sensor 14 is inserted into the aperture 22, and the support portion 42 of the tab 34 is coupled to the sensor 14 to support the sensor 14 relative to the bumper 10. The support portion 42 is coupled to the sensor 14 by means that will be understood by one of ordinary skill in the art, such as an interference fit. In some embodiments, the interference fit is due to interlocking of the sensor 14 and the support portion 42 to cause elastic deformation of the support portion 42, a portion of the sensor 14, or both. In any case, the sensor 14 becomes locked or fixed with respect to the bumper 10 via the engagement with the tabs 34. No intervening structure is positioned between the tabs 34 and the sensor 14. Thus, no retainer is required to secure the sensor 14 to the bumper 10. It should be understood that the sensor mounting arrangement 20 is formed from material of the bumper 10, rather than being separately formed and secured to the bumper 10. The sensor mounting arrangement 20 is therefore not welded to the bumper 10 or fastened in any other way, but is formed from material that originally formed a portion of the bumper 10. While deformation of the tab 34 is described herein as a manufacturing step distinct from formation of the sensor mounting arrangement 20 and from coupling of the sensor 14 to the bumper 10, it should be understood that in some embodiments the tab 34 may be deformed during the material removal process (e.g., during stamping) or during insertion of the sensor 14 into the aperture 22.

FIGS. 8-12 illustrate another sensor mounting arrangement 120 for mounting the sensor 14 to the metal bumper 10. Although the sensor 14 is shown in greater detail in FIGS. 8-12, details of the sensor 14 are not described in further detail and it is understood that the sensor mounting arrangement 20 of the preceding description and the sensor mounting arrangement 120 of FIGS. 8-12 can be used for a variety of different sensors. Similar to the preceding embodiment, the front end of the sensor 14 is positioned flush with the aperture. More particularly, the front end of the sensor 14 may be positioned flush with the exterior (e.g., front in the case of a front bumper) surface 12 of the bumper 10 when secured by the sensor mounting arrangement 120. Although there is a retainer 124 provided between the sensor 14 and the bumper 10, the sensor 14 is situated in (or directly "occupies") the aperture 22 with nothing therebetween. A small clearance for assembly may be provided between the outside of the sensor 14 and the aperture 22 of the bumper 10.

Figure 12:
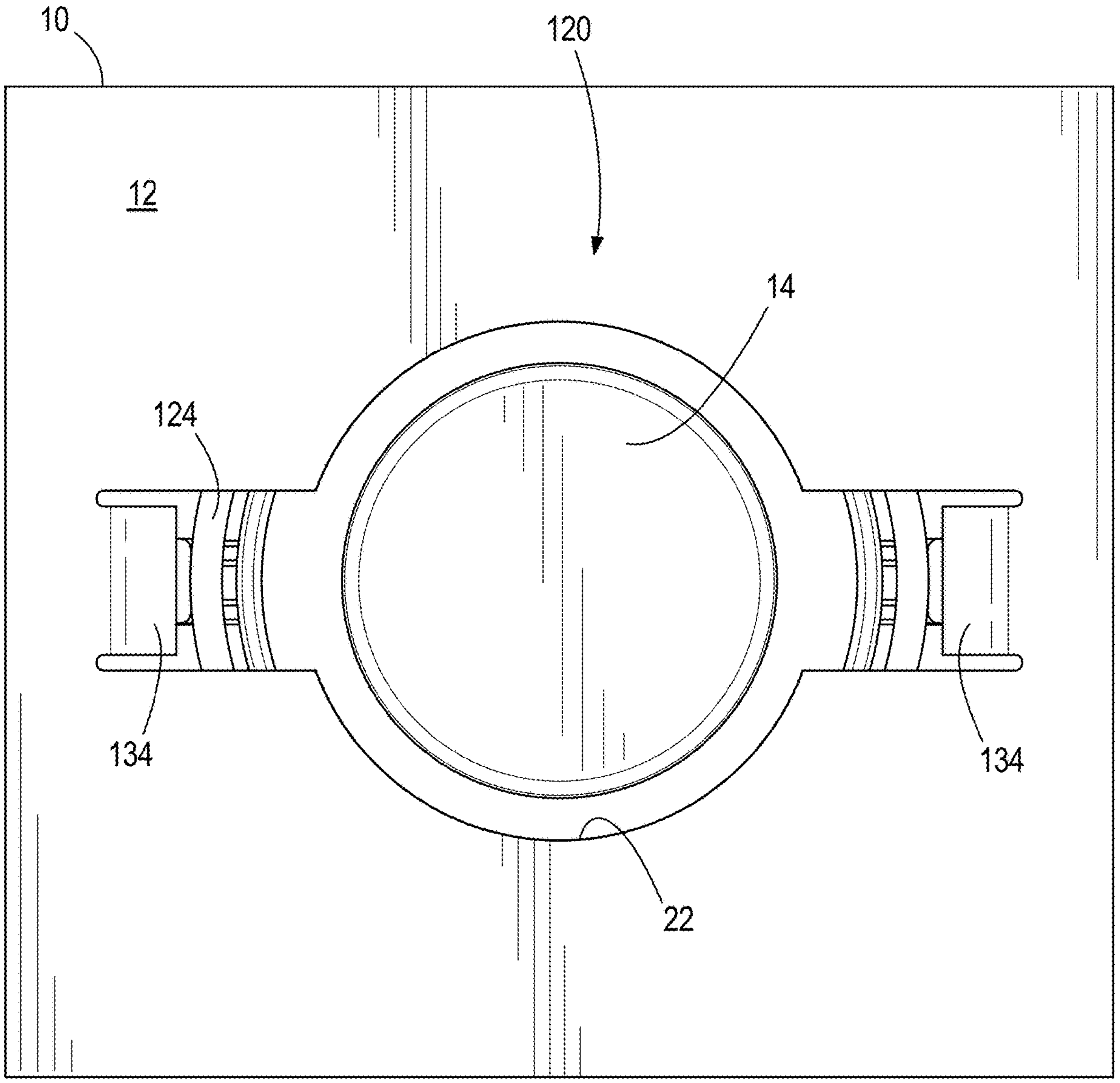
FIG. 12 is a front view of the sensor mounting arrangement of FIGS. 8-11.

The sensor mounting arrangement 120 further includes at least one tab 134 extending from the perimeter of the aperture 22. The tab 134 (e.g., two diametrically opposed tabs) is engageable with a retainer 124 in which the sensor 14 is received to support the sensor 14 relative to the bumper 10. The tab 134 is integrally formed from the same material as the bumper 10. Thus, the tab 134 is not attached to the bumper 10 via a post-processing method (e.g., welding or securing with additional fasteners) during manufacturing of the bumper 10. Rather, similar to the preceding embodiment, the tabs 134 are formed by selectively removing material from the bumper 10 during formation of the aperture 22. Although the sensor mounting arrangement 120 of FIGS. 8-12 can utilize tabs of a construction to those of the preceding figures, the illustrated tabs 134 are of a simplified construction. The tabs 134 may consist of a support portion with an aperture 146, without a separately shaped spacer. Thus, the aperture 146 is directly adjacent the inside surface 13 of the bumper 10. Each tab 134 can engage with a complementary portion of the retainer 124. Unlike the tabs 34 of the preceding embodiment, FIG. 12 illustrates that the tabs 134 are at least partially formed from material not originally located within the perimeter of the aperture 22. For example, some or all of the material forming the tabs 134 is material originally located adjacent the perimeter of the aperture 22. The perimeter of the aperture 22 generally matches that of the sensor 14, and the offset distance between the deformed tabs 134 and the perimeter of the aperture 22 is taken up by the retainer 124. As shown in the drawings, the retainer 124 exceeds the size (e.g., diameter) of the aperture 22 and is prevented from passing through the aperture 22. In the illustrated construction, the retainer 124 includes a flexible portion 136A having a barbed end 136B configured to engage the tab 134, flex inwardly, and snap into the aperture 146 within the tab 134. The same engagement may happen on both sides, engaging both tabs 134. Once engaged, the retainer 124 is prevented from axial movement and prevented from rotational movement with respect to the bumper 10.

Figure 8:
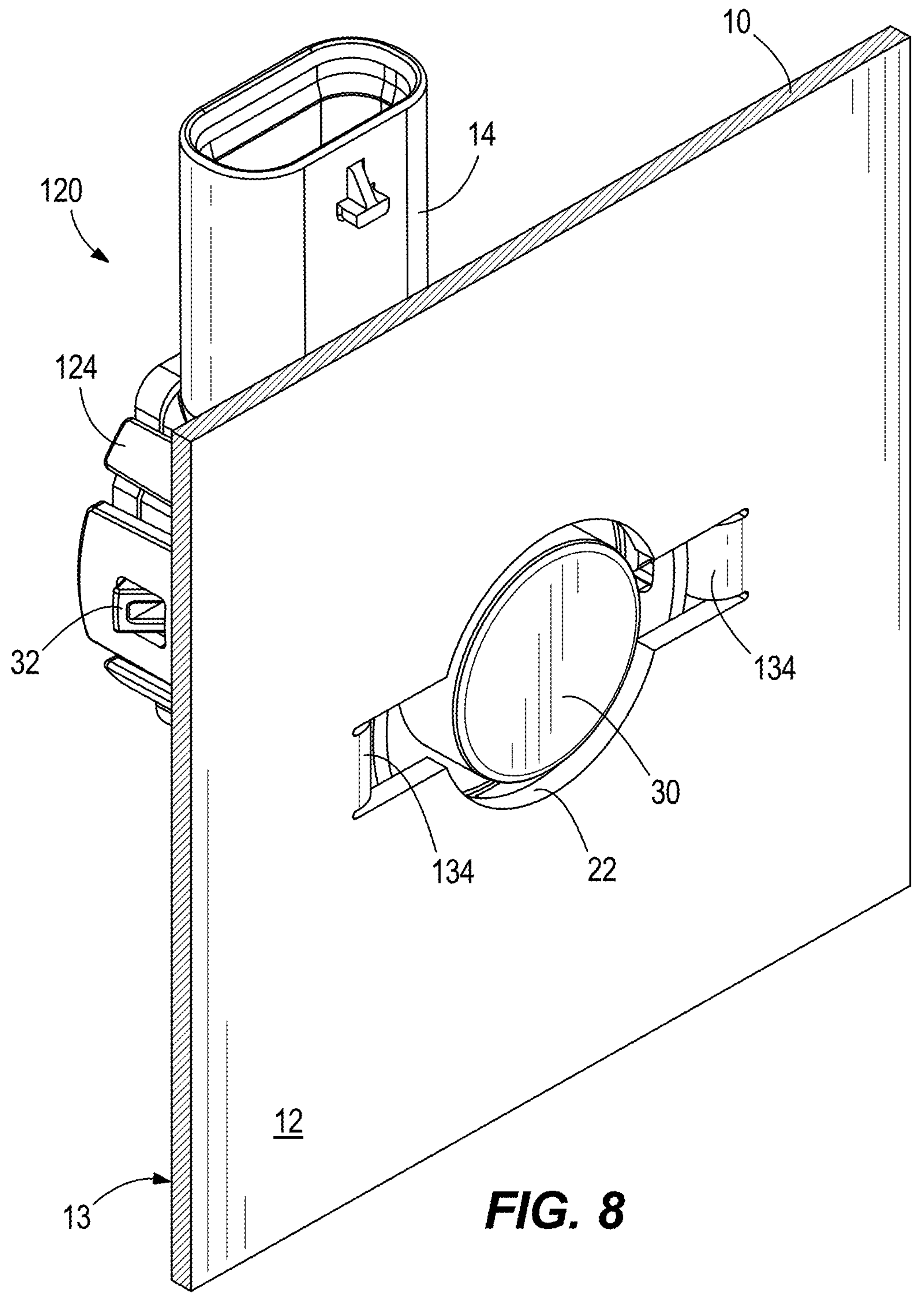
FIG. 8 is a front perspective view of a sensor mounting arrangement of another embodiment of the present disclosure for mounting a sensor to a metal bumper.
Figure 9:
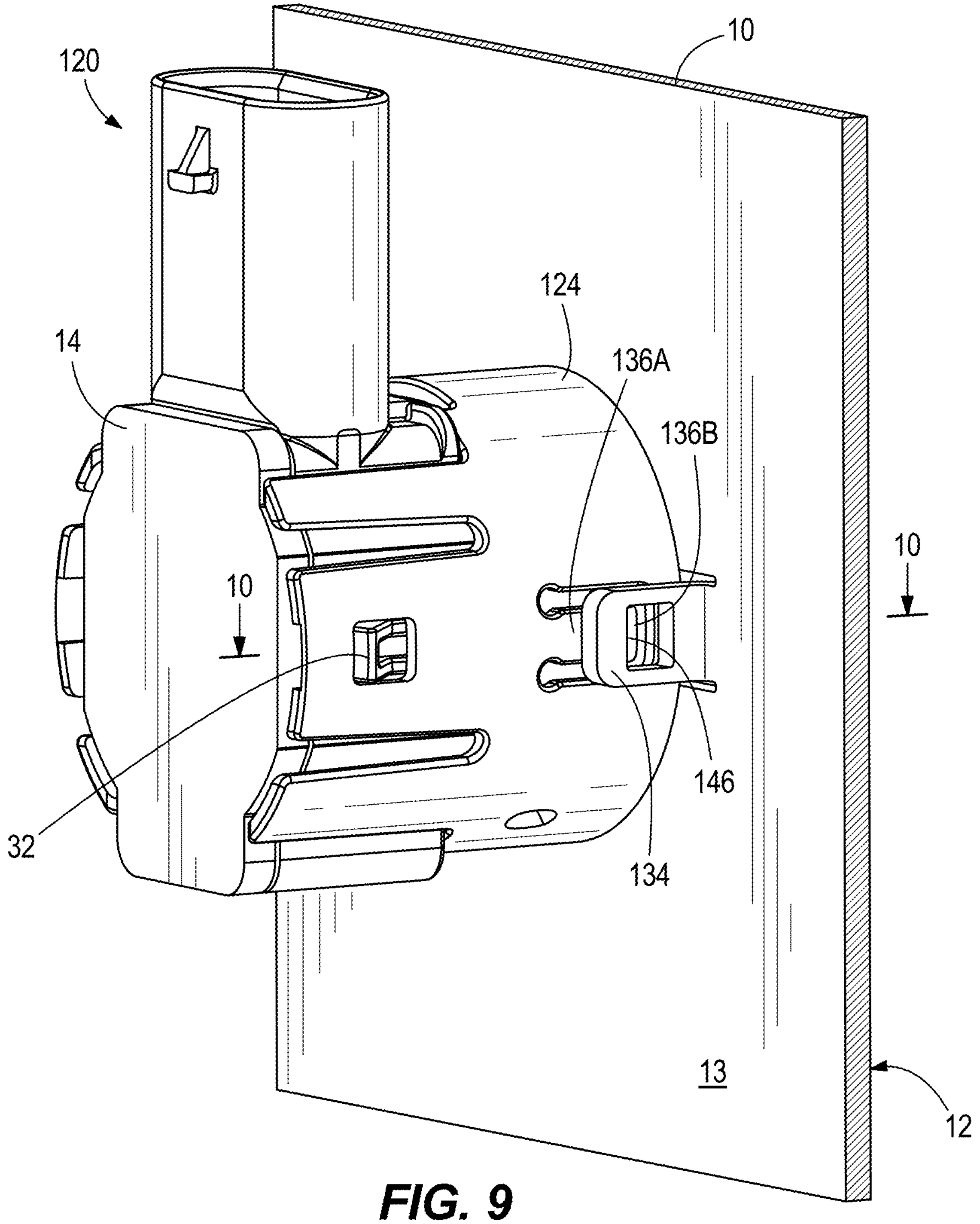
FIG. 9 is a rear perspective view of the sensor mounting arrangement of FIG. 8.
Figure 10:
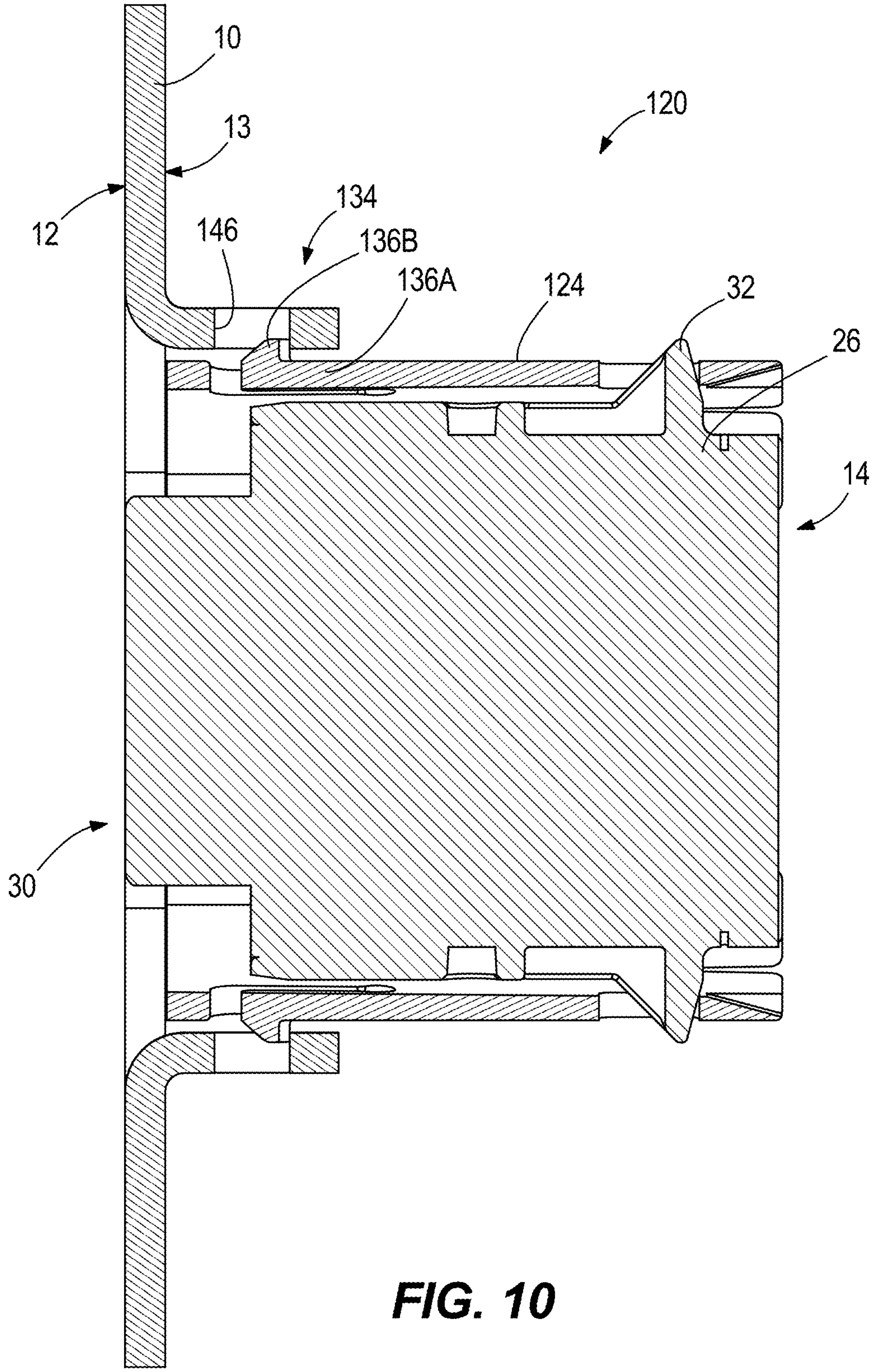
FIG. 10 is a cross-section of the sensor mounting arrangement taken along line 10-10 of FIG. 9.
Figure 11:
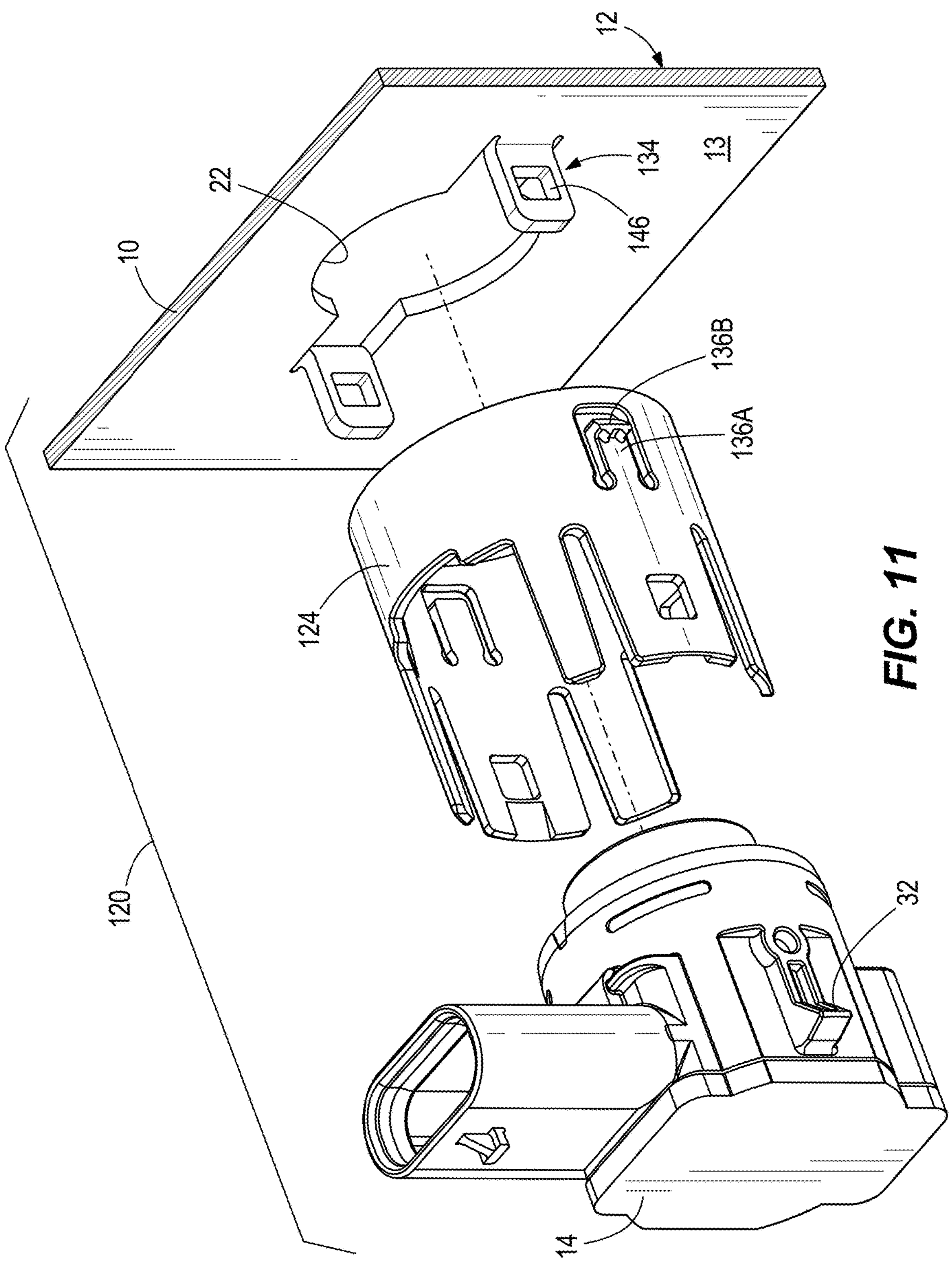
FIG. 11 is an exploded assembly view of the sensor, the metal bumper, and an intervening retainer of the sensor mounting arrangement of FIGS. 8-10.

Although the shape of the aperture 22 may vary among different constructions, the tabs 134 form two substantially rectangular wings that extend out away (e.g., radially in two opposite directions) from the edge of the otherwise circular aperture 22 in the bumper 10 (FIG. 8). It is also noted that an additional modified version of the sensor arrangement shown in FIGS. 8-12 includes the tab(s) 134 formed predominantly or entirely from material originally within the perimeter of the (circular) aperture 22. Such an embodiment includes minimal or no wings extending out away from the aperture 22. Such an embodiment may entirely conceal the retainer 124 from outside the bumper 10. Each of the tab(s) 134 can include multiple bends in some constructions. Furthermore, each of the tab(s) 134 can be an arcuate portion of the original bumper material, similar to that shown in FIG. 3 of the preceding embodiment.

Although the sensor 14 may engage the retainer 124 in any number of optional ways, the illustrated construction illustrates a snap-together fit, free of separate fasteners, adhesive, etc. The locking feature 32 provided on the body 26 of the sensor 14 (further to the rear of the sensor 14 compared to the engagement between the bumper tabs 134 and the retainer 124) engages with an aperture 154 of the retainer 124 to secure the position of the sensor 14 with respect to the retainer 124. In assembly, the sensor 14 and the retainer 124 may be engaged prior to final assembly with the bumper 10. In other constructions, the retainer 124 may be engaged with the bumper 10 prior to final assembly of the sensor 14 into the retainer 124. In the assembled position, the retainer 124 is abutting or directly adjacent to the inside surface 13 of the bumper 10. However, the retainer 124 does not extend into or through the aperture 22, which is only occupied by the sensor 14. Thus, the retainer 124 is not an exposed portion of the bumper 10 or the vehicle having the bumper 10. From outside view, the sensor 14 does not appear to be held by the retainer 124. For example, the retainer 124 does not bridge the gap between the sensor 14 and the bumper 10 as viewed from the outside. Moreover, the visible portion of the sensor 14 may consist of a sensory interface such as a vibrating element or membrane (e.g., of an ultrasonic proximity sensor). Precise color and/or surface finish of the retainer 124 are not required for acceptable outward appearance, like retainers of the prior art, since the retainer 124 is exclusive behind the bumper 10 and effectively hidden from view.

What is claimed is:

1. A method of coupling a sensor to a metal bumper for a vehicle, the method comprising:

providing a substrate configured as a sheet of metal for forming the metal bumper;

forming the metal bumper from the sheet of metal, the metal bumper having an exterior side and an interior side;

forming an aperture within the sheet of metal, including forming a perimeter of the aperture to receive the sensor therein and forming a tab configured to support the sensor; and inserting the sensor into the aperture from the interior side to an assembled position in which a front end of the sensor is flush with the aperture and the sensor is fixed to the metal bumper by the tab.

2. The method of claim 1, further comprising engaging a body of the sensor with a retainer, and engaging the retainer with the tab to fix the sensor, the retainer remaining exclusively on the interior side of the bumper when engaged with the tab.

3. The method of claim 1, wherein the tab is formed from material of the bumper originally located within the perimeter of the aperture, and the tab is deformed from being within a sheet plane of the sheet of metal to being perpendicular to the sheet plane.

4. The method of claim 1, wherein the tab is formed at least partially from material of the bumper originally located within the perimeter of the aperture, and the tab is deformed from being within a sheet plane of the sheet of metal to being perpendicular to the sheet plane.

5. The method of claim 1, wherein inserting the sensor into the aperture includes engaging the tab with a locking feature of the sensor, without any intervening retainer.

6. The method of claim 1, wherein forming the metal bumper from the sheet of metal includes imparting a contour to the metal sheet, simultaneously with the forming the aperture within the sheet of metal.

7. The method of claim 1, wherein forming the metal bumper from the sheet of metal includes imparting a contour to the sheet of metal, separately from the forming the aperture within the sheet of metal.

8. The method of claim 1, wherein inserting the sensor into the aperture includes directly engaging a body of the sensor with the tab to fix the sensor in the assembled position.

9. The method of claim 1, further comprising forming an additional tab configured to support the sensor, wherein the sensor snaps into the tab and the additional tab to fix the sensor to the metal bumper.

10. A metal bumper assembly for a vehicle, formed by the method of claim 1.

11. A method of coupling a sensor to a metal bumper for a vehicle, the method comprising:

providing the metal bumper having an exterior side and an interior side;

forming an aperture within the metal bumper;

forming, from the material of the bumper, a tab configured to support the sensor;

locking a retainer to the bumper via the tab, the retainer remaining exclusively on the interior side of the bumper;

from the interior side, inserting the sensor to an assembled position in which a front end of the sensor is flush with the aperture; and locking the sensor to the retainer.

12. The method of claim 11, further comprising forming, from the material of the bumper, an additional tab configured to support the sensor, wherein the tab and the additional tab are formed simultaneously.

13. The method of claim 12, wherein forming the tab and the additional tab includes deforming the tab and the additional tab out of plane of the aperture.

14. The method of claim 13, wherein the deforming the tab and the additional tab includes bending the tab and the additional tab toward the interior side of the bumper.

15. The method of claim 13, wherein forming the aperture, forming the tab, and forming the additional tab occur simultaneously.

16. The method of claim 11, wherein forming the aperture includes stamping the aperture into the metal bumper.

17. The method of claim 16, wherein forming the tab includes stamping the tab.

18. The method of claim 11, further comprising maintaining the assembled position of the sensor within the aperture by securing a locking feature the sensor to the retainer.

19. The method of claim 11, wherein the tab is formed at least partially from material of the bumper originally located within a perimeter of the aperture, and the tab is deformed from being within a sheet plane of the sheet of metal to being perpendicular to the sheet plane.

20. A metal bumper assembly for a vehicle, formed by the method of claim 11.

* * * * *